United States Patent Office.

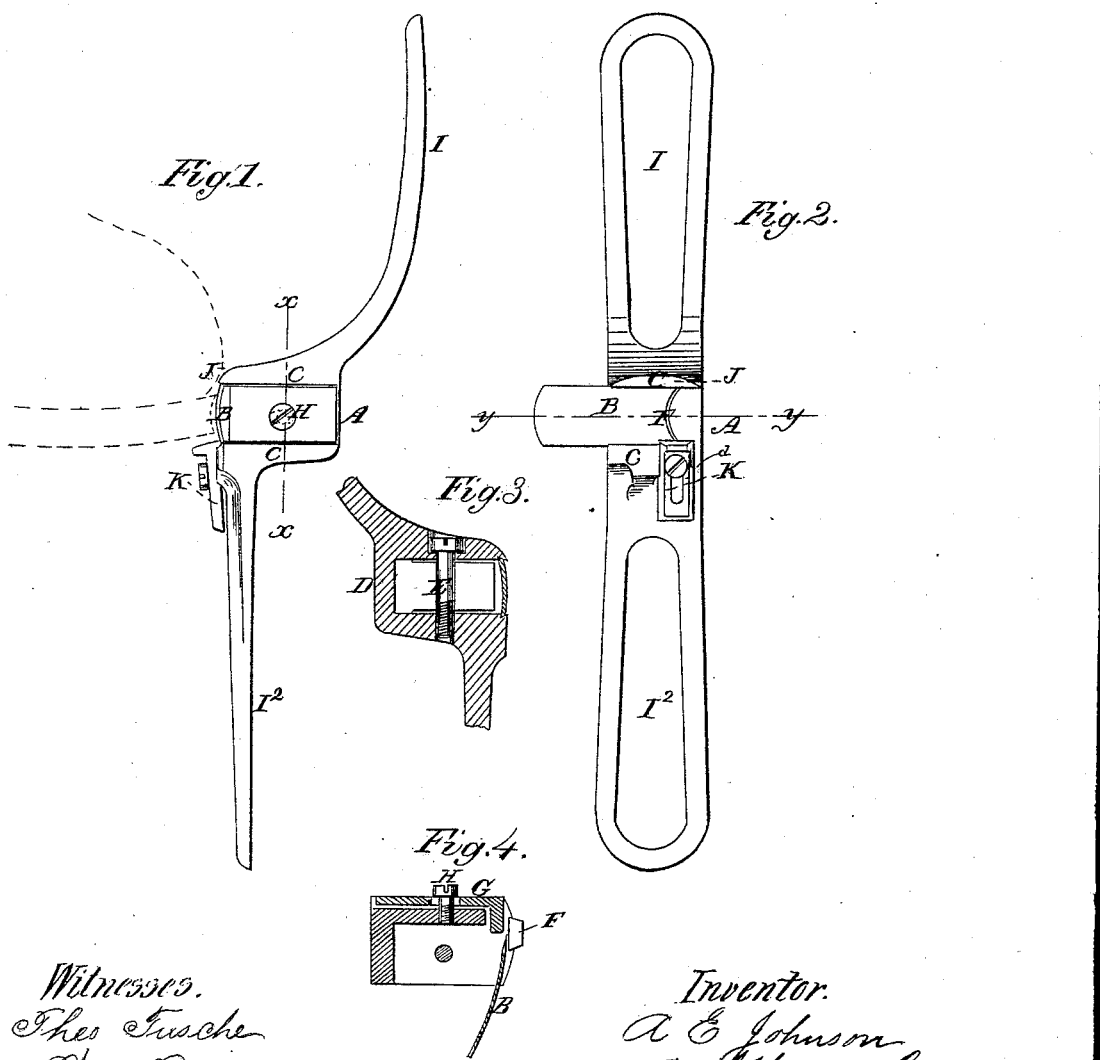

ALBERT E. JOHNSON, OF OXFORD, MASSACHUSETTS.

Letters Patent No. 67,313, dated July 30, 1867.

---

IMPROVED SHAVE FOR BOOTS AND SHOES.

---

The Schedule referred to in these Letters Patent and making part of the same.

---

TO ALL WHOM IT MAY CONCERN:

Be it known that I, ALBERT E. JOHNSON, of Oxford, in the county of Worcester, and State of Massachusetts, have invented a new and improved "Shave for Soles of Boots and Shoes;" and I do hereby declare that the following is a full, clear, and exact description thereof, which will enable others skilled in the art to make and use the same, reference being had to the accompanying drawings, forming part of this specification.

The present invention relates to that class of tools used by boot and shoe-makers for shaving or paring off and trimming up the edges of boot and shoe soles after the upper is secured thereto; and the invention consists principally in so forming or constructing either one or both of the handles to the tool that its cutting or shaving blade can be passed about and around the entire length of the sole from one end to the other, the form of one of the handles being out of line with the other, and so curved on its length as to freely pass by the curve or bilge to the upper at the shank portion of the boot or shoe sole. This invention also consists in using a knife or blade having its cutting edge across its width made of a concave shape, whereby a drawing cut is obtained upon the leather. And furthermore, this invention consists in other improvements in the detail construction of the tool, which for its successful operation are quite important, as will be obvious from the following detail description of the tool, reference being had to the accompanying drawings, in which—

Figure 1 is an edge view of the tool and its handles.

Figure 2, a view of its side where the cutting blade is arranged to act.

Figure 3, a transverse section taken in the plane of the line $x\,x$, fig. 1; and Figure 4, a transverse section taken in the plane of the line $y\,y$, fig. 2.

Similar letters of reference indicate like parts.

A, in the drawings, represents the stock or holder of the tool for the cutter or knife-blade B. This holder A consists of two side pieces C, connected together at one end by a cross-piece, D. Between the side pieces C of the holder A the knife or cutter-blade B is secured; this blade B sliding and fitting in dove-tail shaped grooves of the same, where it is tightly bound by a set-screw or bolt, E, passing through the said side pieces C and across from one to the other. The blade B is convex in the direction of its length, and has a concave cutting edge, F, extending entirely across its width. G, a block forming throat to blade B, this block being placed in and between the two side pieces C of the holder, where, by a set-screw, H, it is susceptible of adjustment, so as to open the throat either more or less, according to the thickness of "chip" which it is desired to shave from the sole edge. From the side pieces C to the holder A, handles I $I^2$ extend, one to each side, which handles are both made of suitable shape to be grasped and held with comfort and ease by the hands, the one handle I being straight, or nearly so, with the other, $I^2$, so curved in the direction of its length, from end to end, or nearly so, bringing the line of such handle to one side of the other, as to allow the cutter or knife-blade to pass around the curve or bulging portion of the upper at the shank of the boot or shoe. J, a raised lip along the holder A, at one side of the knife or cutter-blade B, which lip serves as a guard to the shave when acting upon the boot or shoe-sole edge, and prevents the knife from cutting the upper leather to the boot or shoe. K, a guard on opposite side of holder J to guard-lip J, which guards are arranged so as to be susceptible of adjustment at pleasure, to correspond to the thickness of sole on which the shave is being used, the tool by such guard bearing upon the under side of the sole. The face of the holder A across its width is inclined in a direction from its guard-lip J to its adjustable guard K, consequently, when applied to the edge of the boot or shoe sole, more perfectly conforming to the inclination of such edge, caused by the drawing in of its upper portion as the upper is secured to it. By giving a concave shape to the cutting edge of the knife to the shave a drawing cut is obtained upon the leather edge as the shave is passed over it.

Having thus described my invention, what I claim as new, and desire to secure by Letters Patent, is—

1. A tool or implement for the shaving of the edges of boot and shoe soles, having one of its handles so curved in the direction of its length as to allow the shave to be passed about the curve of the upper at the shank, substantially as described, and for the purpose specified.

2. The guard-lip J, to the knife, in combination with the adjustable guard K, substantially as described, for the purpose specified.

The above specification of my invention signed by me this 9th day of February, 1867.

ALBERT E. JOHNSON.

Witnesses:
WM. F. MCNAMARA,
ALBERT W. BROWN.